Oct. 20, 1964      P. M. MORSE      3,153,327
RECTIFYING FLUID TORQUE CONVERTER FOR OSCILLATING ENGINES
Filed Sept. 23, 1963      4 Sheets-Sheet 1

Paul M. Morse
INVENTOR.

BY *Clarence A. O'Brien*
and *Harvey B. Jacobson*
Attorneys

Paul M. Morse
INVENTOR.

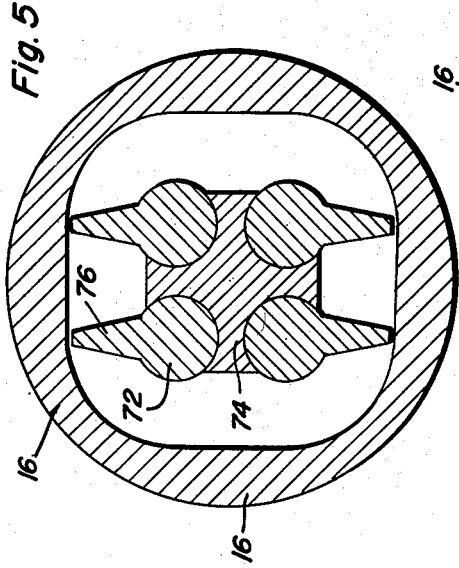
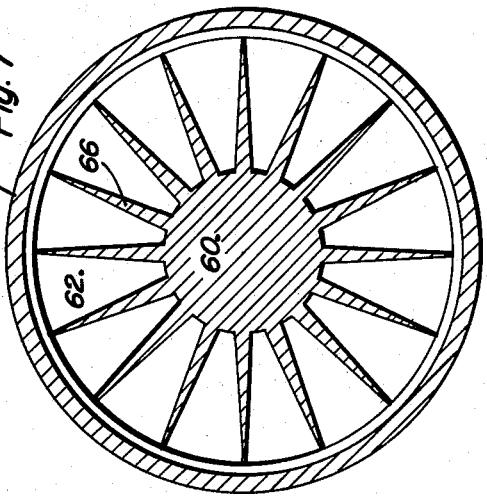
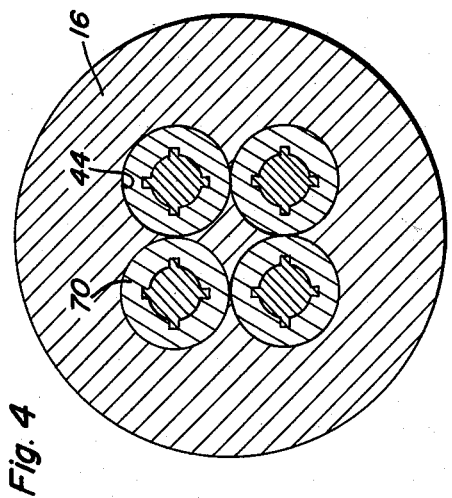
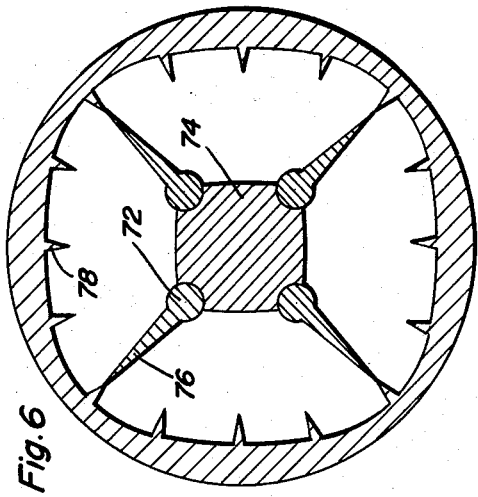

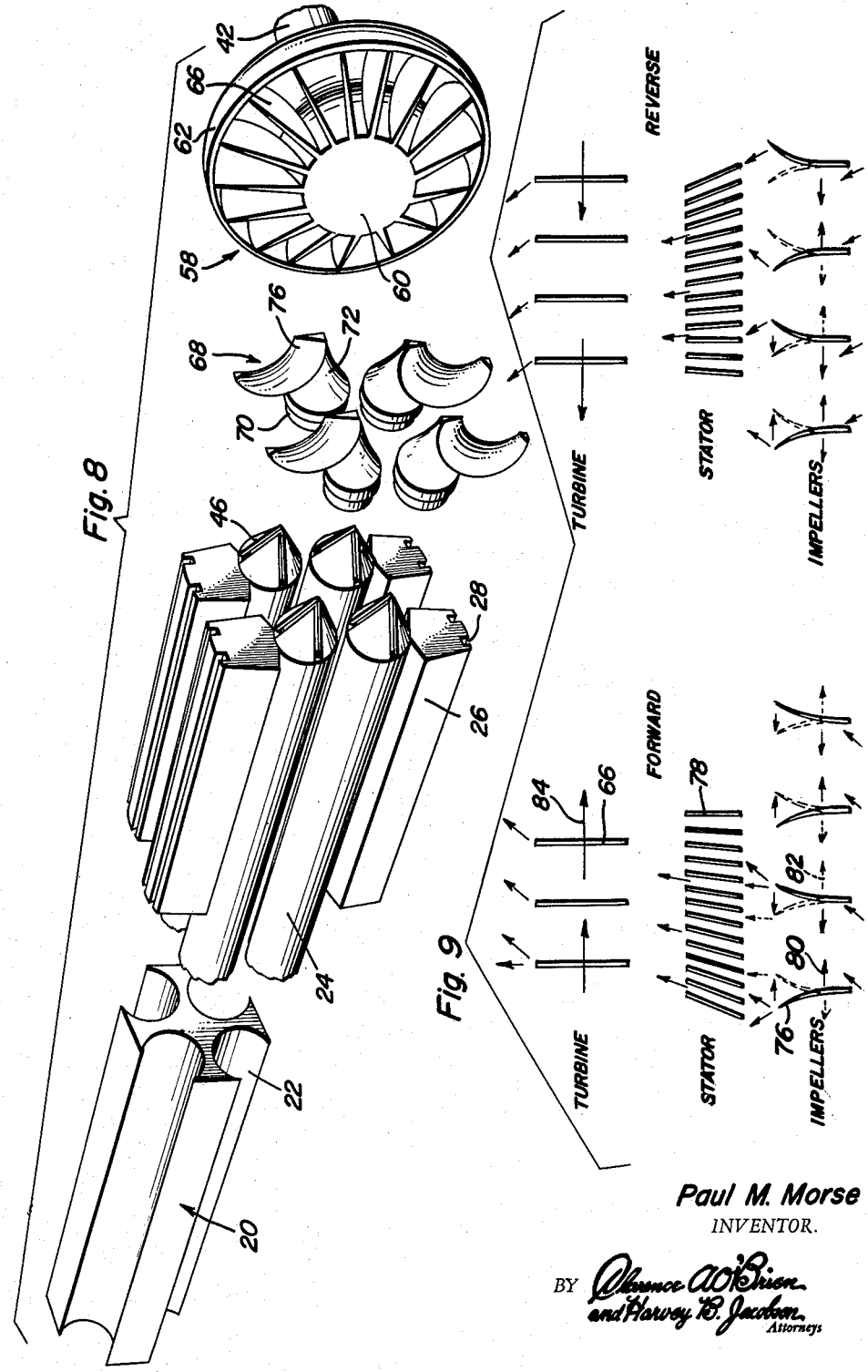

ably through a plane indicated by section line 2—2
United States Patent Office 3,153,327
Patented Oct. 20, 1964

3,153,327
RECTIFYING FLUID TORQUE CONVERTER FOR OSCILLATING ENGINES
Paul M. Morse, R.F.D. 1, Box 204, Carlinville, Ill., assignor of thirty-three percent to John E. Morse, Eureka, Calif.
Filed Sept. 23, 1963, Ser. No. 310,772
4 Claims. (Cl. 60—54)

This invention relates to a torque converter of the hydrodynamic type and more particularly to a hydrodynamic transmitter for converting oscillatory motion into continuous, unidirectional rotation.

In connection with power plants of the internal combustion type, the conversion of energy from the fuel into motive energy directly results in a reciprocatory or oscillatory motion which must then be converted into a unidirectional motion. It is in this latter conversion of motive energy from one form of motion to another form of motion, wherein most of the mechanical losses occur so as to reduce the efficiency of the power plant as well as to increase the cost thereof because of the mechanical parts involved. The unidirectional output of the power plant must then be reduced to a useful speed by a transmission which in the case of automotive transmissions, often involves a hydrodynamic type of torque converter. In accordance with the present invention, a considerable reduction in cost may be effected as well as improvement in operational efficiency by directly converting the oscillatory output motion of the power plant into unidirectional movement through the hydrodynamic torque converter itself, which is a primary object of the present invention.

Another object of the present invention is to provide a fluid torque converter which will directly convert oscillatory motion into unidirectional rotation in any desired installation.

A further object of the present invention is to provide a fluid torque converter having a plurality of impellers mounted for oscillation about axes spaced from a central output axis with respect to which an output turbine member is rotatably mounted. The oscillating input to the impeller members is operative to induce a toroidal flow of fluid within the torque converter, said flow being directionally controlled by reactor blades so that the kinetic energy imparted to the fluid by the impeller members will be given up to the turbine member through which the fluid flows in order to produce continuous, unidirectional rotation of the turbine member.

An additional object of the present invention in accordance with the foregoing objects, is to provide a fluid torque converter in combination with an oscillating output engine of the internal combustion type, involving a novel and efficient constructional arrangement of parts. The engine and torque converter combination therefore features the provision of a plurality of oscillating output members keyed to impeller members having flexible vane portions which induce flow of fluid within the torque converter casing so as to convert the oscillatory movement of the impeller members into unidirectional rotation of the output turbine member.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a transverse sectional view taken substantially through a plane indicated by section line 4—4 in FIGURE 1.

FIGURE 5 is a transverse sectional view taken substantially through a plane indicated by section line 5—5 in FIGURE 1.

FIGURE 6 is a transverse sectional view taken substantially through a plane indicated by section line 6—6 in FIGURE 1.

FIGURE 7 is a transverse sectional view taken substantially through a plane indicated by section line 7—7 in FIGURE 1.

FIGURE 8 is a perspective view of various disassembled parts of the engine and torque converter assembly.

FIGURE 9 is a simplified diagram illustrating typical flow directions of fluid in the torque converter shown in FIGURE 1.

Figure 1:
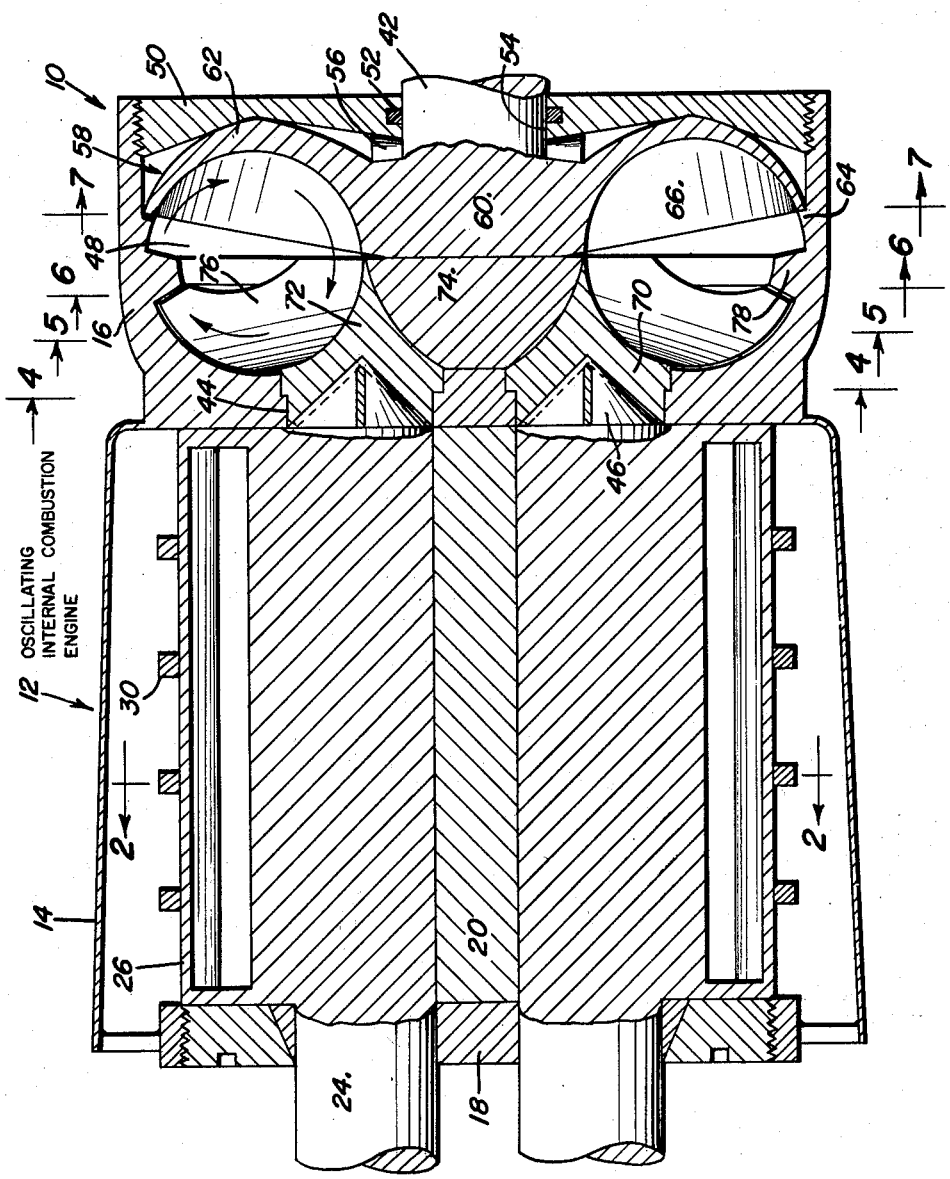
FIGURE 1 is a side sectional view through one form of internal combustion engine and fluid torque converter assembly constructed in accordance with the principles of the present invention.
Figure 3:
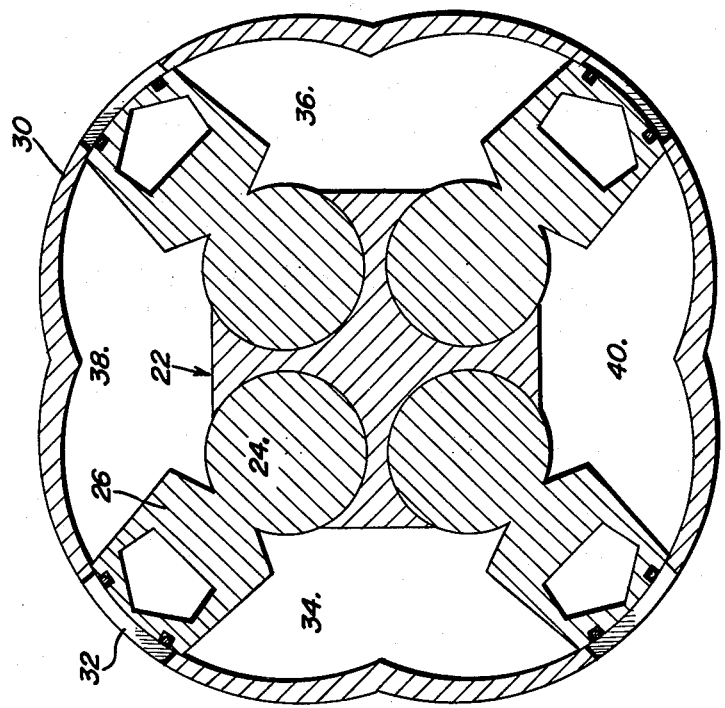
FIGURE 3 is a transverse sectional view similar to FIGURE 2 showing the engine in another operational phase.
Figure 2:
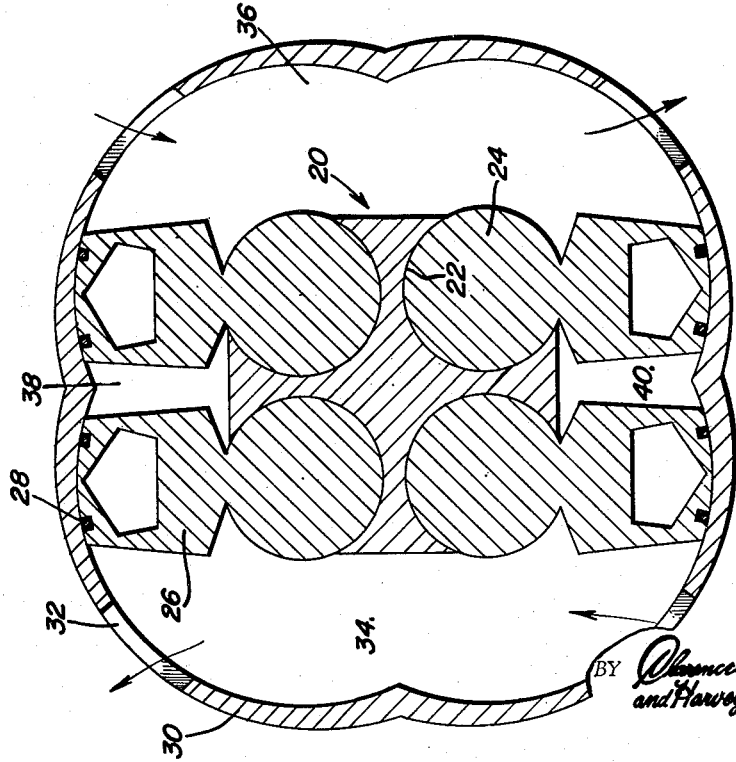
FIGURE 2 is a transverse sectional view taken substantially through a plane indicated by section line 2—2 in FIGURE 1 showing the engine in one operational phase.

Referring now to the drawings in detail, it will be observed that the present invention involves an assembly of a fluid torque converter generally referred to by reference numeral 10 in FIGURE 1, with an oscillating output type of internal combustion engine 12. Internal combustion engines of the oscillating type are known in the art. These engines involve combustion chambers defined between oscillating vane members arranged to produce an oscillating output from one or more of the vane members to which the explosive force is directly imparted when the fuel mixture is admitted to the combustion chamber and ignited therein. In the exemplary engine 12 illustrated, the engine block or casing 14 may be directly secured to the casing 16 of the torque converter 10 with which the engine 12 is associated. Mounted centrally within the engine block 14 and secured to the end plate 18, is a filler block 20 which as more clearly seen in FIGURE 8, includes a plurality of longitudinal recesses 22 arcuate in cross-section so as to rotatably mount a plurality of oscillating output members 24. In the illustrated embodiment, four such recesses 22 and output members 24 are shown. Each of the output members is provided with a radially projecting hollow vane member 26. As more clearly seen in FIGURE 2, each vane member 26 is provided with wiping seal rings 28 on the outer radial surface thereof in sliding contact with the internal surface of a ported combustion chamber wall 30. When associated with four vane members, the combustion chamber wall 30 may therefore have four ports 32 so that combustion chamber spaces 34 and 36 may be exposed to the ports for introduction of a fuel mixture and exhaust of combustion products prior to ignition of the compressed fuel mixture within the combustion spaces 38 and 40 between the vanes 26 as illustrated in FIGURE 2. Accordingly, when ignition of the fuel mixture occurs in proper phase relation, the explosive force of the resulting explosion will displace the vane members from the position illustrated in FIGURE 2 to the position illustrated in FIGURE 3 closing the ports 32. Continued displacement of the vane members 26 in the same direction will then uncover the ports 32 exposing them to the combustion spaces 38 and 40 in order to introduce a fuel mixture and exhaust combustion products from the spaces 38 and 40 while at the same time compressing the fuel mixture admitted to the spaces 34 and 36. Ignition of the fuel mixture in spaces 34 and 36 thereafter, will then displace the vane members in the opposite direction until they occupy the position illustrated in FIGURE 2 completing one cycle of operation. It will therefore be apparent, that alternate ignition of the fuel mixtures in the spaces 34, 36, 38 and 40 will produce oscillatory movement of the vane members and the output members 24 connected thereto. This oscillating output movement is then converted directly into continuous, unidirectional rotation of the output shaft 42 associated with the torque converter 10.

The output shaft 42 of the torque converter is axially aligned with the filler block 20 of the engine 12 and therefore is disposed parallel to and equally spaced from the output members 24. The casing 16 of the torque converter is therefore provided with four stepped bores 44 circumferentially spaced about a central axis with which the output shaft 42 is aligned. Projecting into these bores 44, are the forward conical end portions 46 of the output members 24. The stepped diameter bores 44 also open into a fluid chamber 48 formed within the casing 16, said fluid chamber being closed by a pressure sealing end plate member 50 through which the output shaft 42 extends. A pressure wiping seal 52 is therefore mounted by the end cover member 50 about the central opening 54 therein. Also mounted by the end cover member 50, adjacent the central opening 54, is a conical thrust bearing assembly 56 for resisting the axial thrust applied to an output turbine member 58 connected to the output shaft 42.

As more clearly seen in FIGURES 1, 7 and 8, the output turbine member includes a hub portion 60 to which the output shaft 42 is connected and to which an annular shell portion 62 is secured to form a portion of a toroidal fluid chamber within the casing 16 of the torque converter. Toward this end, the shell portion 62 of the turbine member cross-sectionally extends for slightly less than 180 degrees with respect to the toroidal chamber as defined by the shoulder portion 64 projecting radially inward from the casing 16. Also secured to the hub portion 60 and extending radially within the shell portion 62, are a plurality of equally spaced turbine blade members 66 arranged to guide fluid flow in a generally toroidal flow path in a radially inward direction as shown by the arrows in FIGURE 1. The output turbine member 58 is therefore an inflow turbine so that the flow of fluid may exit from the turbine member at the radially inner portions of the impeller members 68 associated with the torque converter.

Referring now to FIGURES 1, 4, 5, 6 and 8, it will be observed that four impeller members 68 are provided, each being associated with one of the output members 24 of the engine. Each impeller member is therefore provided with a hub portion 70 rotatably mounted within the bores 44 of the casing 16. The hub portion 70 is therefore provided with a conical recess through which the impeller member is splined to the conical portion 46 of the output member with which it is associated. Oscillatory movement of the output member is thereby imparted to the impeller member. Projecting forwardly from the hub portion 70 of the impeller member, is a tapered portion 72. The radially inner surface of the tapered portion 72 is in bearing contact with a bearing block 74 centrally disposed in axially abutting relation between the casing 16 and the hub portion 60 of the turbine member. Connected to the radially upper surface of the tapered portion 72 is a relatively flexible impeller vane member 76 which conforms to the toroidal flow path for a distance less than 180 degrees as will be clearly seen in FIGURE 1. The impeller vane members 76 therefore extend into the fluid chamber between the radially inner portion of the turbine blade members 66 and radially inwardly projecting reaction blade elements 78 as more clearly seen in FIGURES 1 and 6. Oscillation of the impeller blade members will therefore induce fluid flow in a generally radially outward direction as shown by the arrows in FIGURE 1, with the fluid being redirected by the reaction vane elements 78 upon exit from the impeller blade portions 76 and before entry into the radially outer portions of the turbine blade members 66. As will be noted by comparing FIGURES 5 and 6, the impeller blade portions 76 taper in radially outward directions so that upon oscillation of the impeller members, the blade portions will flex as they compress fluid therebetween inducing the radially outward flow of fluid. The fluid therefore assumes a toroidal flow path in cross-section as shown by the arrows in FIGURE 1 in addition to movement in a transverse direction about the rotational axis of the output shaft 42.

Referring now to the diagram of FIGURE 9, it will be observed that the solid arrows indicate fluid flow along the impeller blade portions 76 through the stator or reaction elements 78 and the turbine blades 66. Flow of the fluid in the directions indicated representing the toroidal flow path, is produced by the oscillatory movement of the impeller blade portions 76 in the direction of rotation as indicated by the solid and dotted arrows 80 and 82. The fluid flow will then be redirected by the reaction blade elements 78 so that upon entry into the turbine member, a forward thrust will be imparted thereto in the direction of the arrows 84 as the fluid passes through the turbine member before returning to the space in which the impeller blades are located. Inasmuch as the impeller blade portions 76 flex, fluid flow will be induced in a radially outer direction with respect to the toroidal flow path during movement of the impeller blade members in both directions 80 and 82 so that thrust will be applied continuously to the turbine member in the same direction 84. Kinetic energy will thereby be imparted to the fluid in an outflow direction through the impeller members, this kinetic energy being given up in the turbine member so as to produce rotation thereof in one direction, this direction being determined by the angle of the reaction blade elements 78. Because of the arrangement of the impeller members with respect to the inflow turbine member and the provision of the reaction blade elements 78, torque multiplication is obtained as is well known to those skilled in the art. However, in view of the spacing of the rotational axes of the impeller members with respect to the central output axis of the turbine member and the flexible nature of the impeller blade portions, an oscillatory input motion is converted into a unidirectional output rotation. In this manner, not only may the output of an engine be reduced in speed with torque multiplication so that the motive energy output of the engine may be utilized, but the mechanical linkages or parts heretofore necessary in connection with conversion of reciprocatory movement to unidirectional motion, is eliminated as well as the mechanical losses associated therewith. The engine and torque converter assembly hereinbefore described will therefore find wide utility in many different installations including automotive, marine and aircraft installations.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a power plant having a plurality of output members rotatably mounted for oscillation about parallel axes equally spaced from a central axis, a fluid torque converter comprising, a casing enclosing a fluid chamber axially aligned with said central axis, an output turbine rotatably mounted in said chamber by the casing about said central axis, a plurality of impeller members rotatably mounted by the casing about said parallel axes and driven by said output members, said impeller members and said output turbine forming a toroidal flow path within said fluid chamber, and reaction blade means mounted on the casing and projecting into the toroidal flow path for directing fluid flow from the impeller members into the output turbine.

2. The combination of claim 1, wherein each of said impeller members including a rigid hub portion keyed to an output member, and a flexible outflow blade fixed to the hub portion projecting into the toroidal path for oscillation about one of the parallel axes.

3. The combination of claim 2, wherein said turbine includes a plurality of relatively rigid inflow vanes projecting into said toroidal flow path for rotation about said central axis, said reaction blade means being disposed between the radially outer portions of the inflow vanes and the flexible outflow blades of the impeller members.

4. In combination with a power plant having a plurality of output members rotatably mounted for oscillation about parallel axes equally spaced from a central axis, a fluid torque converter comprising, a casing enclosing a fluid chamber axially aligned with said central axis, an output turbine rotatably mounted in said chamber by the casing about said central axis, impeller means operatively connected to said output members for inducing toroidal flow of fluid through said chamber in response to oscillation of said output members to produce continuous, unidirectional rotation of the turbine about said central axis, said turbine including a plurality of inflow vanes projecting into said toroidal flow path for rotation about said central axis, and reaction blade means disposed between the radially outer portions of the inflow vanes and the impeller means.

References Cited in the file of this patent

UNITED STATES PATENTS

| 1,130,188 | Mueller | Mar. 2, 1915 |
| 2,004,019 | Swetenham | June 4, 1935 |
| 2,296,695 | Zworykin | Sept. 22, 1942 |
| 2,611,321 | Shafer | Sept. 23, 1952 |